United States Patent
Goldberg et al.

[15] 3,655,908
[45] Apr. 11, 1972

[54] APPARATUS FOR REPRODUCING COLOR PICTURE INFORMATION

[72] Inventors: Abraham A. Goldberg, Stamford; Renville H. McMann, Jr., New Canaan, both of Conn.

[73] Assignee: Columbia Broadcasting System, Inc.

[22] Filed: June 19, 1970

[21] Appl. No.: 47,740

[52] U.S. Cl. ....................................178/5.4 CD, 178/6.7 A
[51] Int. Cl. ....................................................H04n 9/12
[58] Field of Search ................178/6.7 A, 5.4 CB, 7.2 D, 5.2, 178/5.4

[56] References Cited

UNITED STATES PATENTS

| | | | |
|---|---|---|---|
| 3,475,549 | 10/1969 | Goldmark et al. | 178/5.2 |
| 3,459,885 | 8/1969 | Goldmark et al. | 178/5.4 CR |
| 3,522,371 | 7/1970 | Goldmark | 178/5.4 CR |

*Primary Examiner*—Robert L. Richardson
*Assistant Examiner*—Richard P. Lange
*Attorney*—Spencer E. Olson

[57] ABSTRACT

Apparatus for reproducing color picture information that has been recorded on a record medium in a succession of information-bearing areas including areas carrying luminance picture information and different areas carrying color picture information in the form of superimposed records of two color difference signals, suppressed carrier modulated in quadrature phase to each other and a pilot carrier signal at a different frequency. The system comprises means including a flying spot scanner for scanning the record medium without line tracking and a pair of photomultipliers for respectively detecting the luminance and color picture information. The color information signal, containing the color difference signals and the pilot signal are separated into its individual components, and the color signals are directly translated to NTSC frequency, or other frequency standard, by frequency conversion for combination with the luminance picture information signal for presentation on a television receiver.

8 Claims, 6 Drawing Figures

INVENTORS.
ABRAHAM A. GOLDBERG
RENVILLE H. McMANN, JR.
BY
Spencer E. Olson
ATTORNEY INVENTORS.
ABRAHAM A. GOLDBERG
RENVILLE H. McMANN, JR.
BY
ATTORNEY INVENTORS.
ABRAHAM A. GOLDBERG
RENVILLE H. McMANN, JR.
BY
Spencer E. Olson
ATTORNEY

APPARATUS FOR REPRODUCING COLOR PICTURE INFORMATION

BACKGROUND OF THE INVENTION

This invention relates to apparatus for reproducing color picture information signals recorded in monochrome on a record medium in a succession of frames and, more particularly, to an improved technique for processing the color picture information signals reproduced by such apparatus.

In pending application Ser. No. 519,106 entitled "Color Film Recording and Reproducing Apparatus," now abandoned in favor of continuation application Ser. No. 862,854, filed July 25, 1967, which, in turn, has been abandoned in favor of continuation application Ser. No. 61,424, filed Aug. 5, 1970, assigned to the assignee of the present invention, there is described apparatus for recording luminance information in one frame portion of a film strip and coded color information in a separate frame portion of the same film strip. The luminance information may be in pictorial form and the color information takes the form of a record including a first carrier signal component modulated in phase and amplitude according to the color saturation and at one-half the color carrier frequency, both frequencies being multiples of the line recording rate. The color information is preferably recorded as a succession of parallel lines extending transversely of the film and spaced longitudinally thereof, each line comprising a record of the modulation sidebands of a suppressed color carrier modulated as a function of the color information in the picture. Also recorded in each line is the pilot signal which is utilized during playback for extracting the color information contained in the color modulation sidebands. The pilot signal frequency is outside of the frequency band occupied by the color sidebands and it may be one-half of the color carrier frequency. With both the color carrier and the pilot having frequencies which are multiples of the recording line rate, the recorded information tends to form a succession of parallel bars extending longitudinally of the film. In an embodiment which has been successfully operated, the color carrier frequency is 1.8 MHz. and the pilot signal frequency is 0.9 MHz.

As described in U.S. application Ser. No. 776,137 for "-Video Film and Film Recording Apparatus," now U.S. Pat. No. 3,609,228, also assigned to the assignee of this invention, the two adjacent successions of picture frames, respectively containing luminance and chrominance information, are separated by an intermediate strip containing synchronizing indicia, such as small transparent windows in precise predetermined location with respect to the frames, which are sensed during reproduction to provide synchronization.

Playback of the recorded information is accomplished with a flying spot scanner using the technique disclosed, for example, in U.S. Pat. No. 3,410,954 which employs a scanning raster having a dimension in the scanning zone equal to twice the pitch distance between adjacent frames of recorded information. The record medium is conveyed continuously through the scanning zone at such a speed that each frame moves one frame pitch while the flying spot scans two frame pitches during each vertical scan, synchronism between the rate of movement of the record medium and the scanning rate being provided by circuitry responsive to the synchronizing indicia recorded on the film.

Unlike magnetic tape video recording systems wherein line-to-line tracking is assured by the geometry of the recording-playback mechanism, no attempt is made to scan over the lines originally recorded on the film because of the inability to sufficiently accurately control the raster. It is for this reason that the information is recorded in the manner described above, namely, in a form that the phase of the color subcarrier and the pilot signal are essentially the same from line-to-line so as to form the bar pattern on the film. However, the NTSC signal requires that the chroma be presented as a pattern of interleaved dots, and moreover, the NTSC subcarrier frequency of 3.58 MHz. is an odd multiple of one-half the line frequency, whereas the color subcarrier used in recording (1.8 MHz.) is a multiple of the line frequency. Also, because of non-linearities the velocity of the scan may vary by as much as ± 5 percent with an accompanying shift in the chroma spectrum, it is not possible to use a subcarrier burst at the beginning of each line, such as is used in the NTSC system; instead, the recorded pilot signal is provided to make the system self-correcting on playback.

Heretofore, the practice has been to decode the reproduced chroma information to the base-band color difference signals, or to the read, blue and green components, and then re-encode with an NTSC encoder to derive an NTSC signal for application to a standard color television receiver for reproduction. This system required the use of many critical gain control and balancing circuits which resulted in a potentially unstable system that, in turn, caused unacceptable color drift.

SUMMARY OF THE INVENTION

An object of the present invention is to remedy the shortcomings of the prior methods of reproducing chroma information recorded in the manner described above. In particular, an object of the invention is to provide apparatus for detecting and translating the quadrature modulated color subcarrier recorded on the film to a 3.58 MHz. frequency so as to be compatible with NTSC receivers.

In accordance with the invention, the information recorded on the film is recovered by a flying spot scanner which simultaneously scans adjacent luminance and chrominance frames, and a pair of photomultipliers for producing separate signals corresponding to the luminance information and the chroma information, respectively. The chroma information signal, typically including NTSC "I" and "Q" signals as quadrature modulation of a 1.8 MHz. carrier, and the pilot signal at one-half that frequency, is separated into its chroma and pilot components by suitable filters, and the chroma component translated directly to NTSC frequency by a frequency conversion process utilizing the pilot signal and a locally generated 3.58 MHz. sinusoidal signal. By suitable mixing of the signals involved and judicious selection between the frequencies produced by the mixing action, an NTSC chroma signal is derived. Regardless of spectral shifts in the detected chroma frequency caused by non-linearities in scan velocity, for example, the output of the translator is a constant 3.58 MHz. chroma signal. The luminance representing signal, after being delayed slightly to compensate for the delay introduced in the chroma signal by the translation process, is added to the NTSC chroma signal to produce a composite signal which is reproducible on a standard NTSC television receiver.

With minor modification, the invention is equally applicable to the PAL system of color television utilized in certain European countries, except, of course, that different frequencies would be employed in recording the chroma information on the film, and correspondingly different frequencies used in the translator to derive chroma signals having the 4.43 MHz. subcarrier frequency employed in the PAL system. However, since in the PAL system the phase of the R-Y component is reversed at the line rate, the signal derived from the translator must be modified before it can be reproduced on the receiver. In accordance with another aspect of the invention, the 4.43 MHz signal delivered by the translator is multiplied by cos 2 $\omega t$ (with 2 $\omega t$ = 8.86 MHz.) to reverse one of the phase components of the 4.43 MHz. signal. The reversed and unreversed phase components are then selected at one-half the line frequency to provide a PAL-type signal without having to first demodulate to base-band and then re-encode to PAL standards.

DESCRIPTION OF THE DRAWINGS

For a better understanding of the invention, reference may be made to the following detailed description and to the drawings, wherein.

DESCRIPTION OF THE PREFERRED EMBODIMENTS

Figure 1:
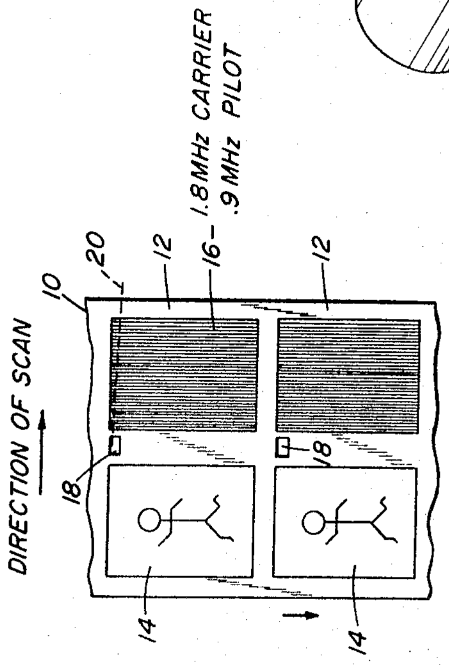
FIG. 1 is a plan view of a fragmentary portion of a record medium illustrating a representative format of recorded luminance and color picture information to be reproduced with apparatus in accordance with the invention.

A typical monochrome record of color information recorded in accordance with the teaching of aforementioned application Ser. No. 519,106 is shown in FIG. 1 and comprises a conventional film base 10 having recorded thereon a succession of frames 12 of color picture information. Each frame is divided into two adjacent portions 14 and 16, each typically having a format of 100 × 128 mils, with the frame portion 14 recorded with luminance, or picture brightness information, and the frame portion 16 recorded with color information. Such luminance information and its associated color information may be anamorphosed and recorded either optically or electronically, preferably with an electron beam recorder, with the luminance image extending in the direction parallel to the extent of the film and to be presented "feet first" during playback when the film is moved in the direction indicated by the arrow. The intermediate strip separating the frame portions 14 and 16 contain small transparent windows 18 in precise predetermined location with respect to the frames which are sensed during reproduction to provide synchronization of the motion of the film with the scanning apparatus.

The color information in the frame portion 16 is comprised of a succession of mutually displaced parallel lines extending laterally across the frame portion 16. Each of the lines (which are not discernible in FIG. 1) contains a record of the modulation sidebands of a suppressed color carrier modulated as a function of the color information in the picture. In accordance with a preferred embodiment, the NTSC "I" and "Q" color components quadrature modulate a carrier having a frequency of 1.8 MHz., which is a multiple of the line frequency employed in the NTSC system. In addition, each of the lines contains a superimposed pilot signal for recovering the chrominance information when the record is reproduced. The pilot signal frequency is outside of the frequency band occupied by the color sidebands, typically ±0.5 MHz., and in a preferred embodiment is one-half that of the color carrier, or 0.9 MHz. The carrier and pilot signal frequencies both being multiples of the recording line rate, the recorded information tends to form a succession of parallel bars extending longitudinally of the film as shown in FIG. 1, thereby maintaining the phase relationship of the carrier recorded in the scan lines. Among the reasons why this form of record was selected is that flying spot scanner systems are not sufficiently precise to scan the laterally recorded lines. The bar pattern of FIG. 1 insures that even if there is skew of the playback raster, as indicated by the dotted line 20, the phase of the reproduced color subcarrier and the pilot signal will be essentially the same from line to line so as to permit recovery of the color information.

Figure 2:
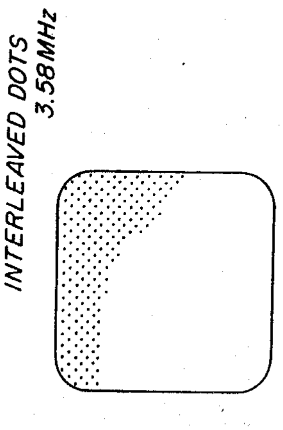
FIG. 2 is a plan view illustrating the format in which color information is reproduced on the screen of an NTSC color television receiver.

From the foregoing it will be evident that the overall requirement of the playback system is to recover the color information recorded on the frame portion 16 of FIG. 1, which comprises a color subcarrier and a pilot signal both having frequencies which are multiples of the line frequency, and to produce an NTSC color signal having a frequency of 3.58 MHz., which is an odd multiple of one-half the line frequency, in a form to be presented on the screen of a television receiver as a pattern of interleaved dots as shown in FIG. 2. Heretofore, this overall function has been achieved, somewhat unsatisfactorily, by scanning the film record with a flying spot scanner to derive the chroma and pilot signals, and decoding the reproduced chroma information either to the baseband color difference signals, or to its red, blue and green components, and then re-encoding with an NTSC encoder to derive a signal suitable for application to a standard NTSC receiver for reproduction. This prior method of processing the chroma signal required the use of many critical gain control and balancing circuits which, even when constructed with precision components, was potentially unstable in operation and thus subject to unacceptable color drift. An important aspect of the present invention is the recognition that the NTSC "I" and "Q" information present on the record medium as quadrature modulation of a 1.8 MHz. carrier signal can be directly translated to a 3.58 MHz. color signal compatible with NTSC receivers, without the troublesome intermediate steps of demodulating the color difference signals and then re-encoding them to NTSC standards.

Figure 3:
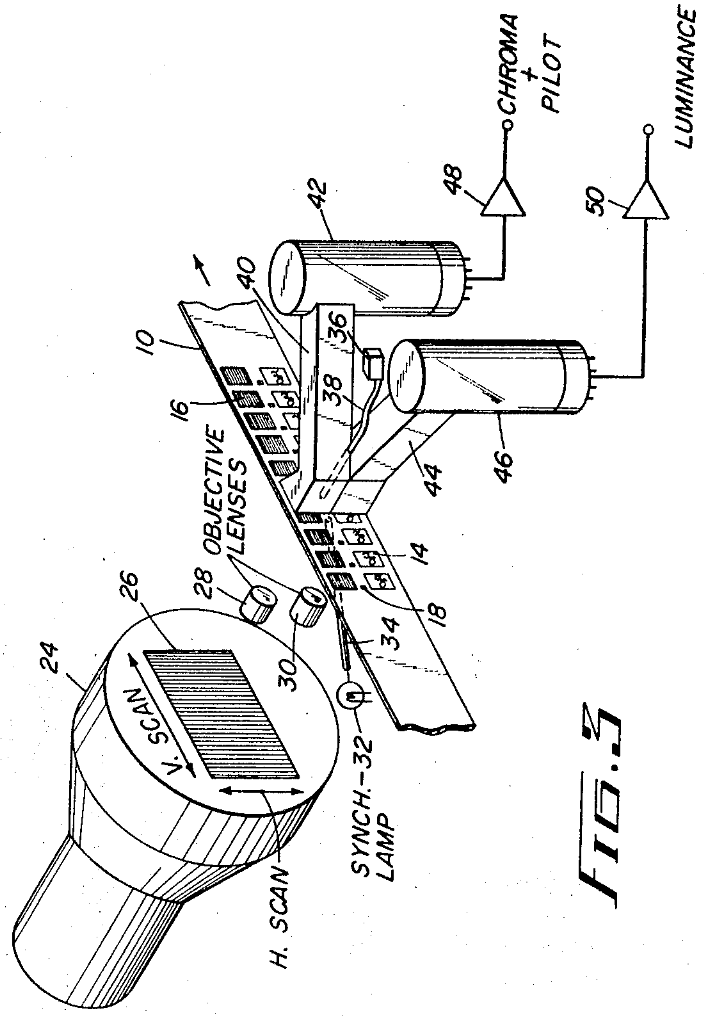
FIG. 3 is a diagrammatic view of a system for reproducing luminance and color information signals from a color picture record of the type shown in FIG. 1.

Turning now to FIG. 3, there is diagrammatically illustrated a system for reproducing luminance and color information signals from the color picture record of the type shown in FIG. 1. The system includes a cathode ray tube flying spot scanner 24 which, in a preferred embodiment, has a face three inches in diameter, and to which are supplied horizontal deflection and blanking signals (by means not shown) to develop a raster scan 26, the individual scans lines of which are in a direction normal to the longitudinal bars on the record medium containing the chroma information signals. The scanning beam of tube 24 passes through a pair of objective lenses 28 and 30 placed one above the other so as to be aligned with the chroma portion 16 and the luminance portion 14, respectively, of the record medium. The demagnification produced by the lenses reduces the dimensions of the raster 26 (1.3 × 2 in. in a typical embodiment) to 0.13 × 0.2 in. at the scanning gate past which the film 10 is drawn in the direction indicated by the arrow. In a system having the frame dimensions mentioned earlier, the film is guided past the gate at the rate of 60 frames per second, or 6 inches per second; in Europe the speed would be 5 inches per second to match the 50 fields per second of European systems. The apparatus employs a forward raster scan technique, which accounts for the scanning raster having a dimension at the scanning gate equal to twice the pitch distance between adjacent frames of recorded information. As fully described in the aforementioned U.S. Pat. No. 3,410,954, at the start of a given scan, the cathode ray tube beam is directed toward the head of the frame, and as the record medium moves at constant speed toward the right at 6 inches per second, the beam also moves to the right, but at twice the velocity, or 12 inches per second. Thus, by the time a picture has moved through the gate it has been completely scanned and the light beam rests at the foot of the picture. It will be appreciated that both the luminance and chroma portions of the film are simultaneously scanned in this manner. Vertical flyback of the beam is initiated by light pulses passing through the clear windows 18 which are illuminated by a lamp 32 and light pipe 34, and detected by a photodetector 36 to which the light pulses are coupled by second light pipe 38.

The portion of the light from the raster scan intercepted and modulated by the chroma information recorded on film portions 16 is collected by a light pipe 40 and directed to a first photomultiplier tube 42 which converts the modulated light into a video signal including the recorded chroma and pilot signal information. The portion of the raster intercepted by the luminance frame portions is collected and directed by a separate light pipe 44 onto a second photomultiplier 46 which converts it to a luminance video signal. The chroma and luminance signals are respectively amplified in amplifiers 48 and 50 with the amplified chroma and pilot signal presented to the input terminal of a system for directly translating the chroma frequencies to a 3.58 MHz. chroma signal compatible with standard NTSC television receivers.

From what has been said earlier, the signal appearing at the output of amplifier 48 contains the modulated 1.8 MHz. color carrier frequency and the 0.9 MHz. pilot signal frequency, but because of certain system limitations, the scanning velocity during playback may vary by ± 5 percent with an accompanying shift in both the pilot and chroma frequencies. Although both pilot and chroma undergo the same percentage of frequency shift and thus retain their original ratio, the phase responses of the filters in the to be described translator may not track beyond a certain range and thus will cause hue errors in the reproduced picture. Thus, it should be kept in mind in the discussion to follow that the color carrier and pilot frequencies in an operative system may vary appreciably from their nominal values of 1.8 and 0.9 MHz., respectively. The presence of the pilot signal, however, which undergoes the same frequency shifts as the chroma signals, makes the system self-correcting within the phase tracking range of the filters.

Broadly, the signal processing technique used to produce the NTSC color signal, while at the same time accomplishing correction of frequency shifts introduced by scanning, consists of translating either the pilot or color subcarrier frequency to a different frequency band, and then beating this signal with another containing the same phase drift. The translation is accomplished by introducing a stable locally generated 3.58 MHz. sinusoidal signal with the result that the difference frequencies in the heterodyne product are centered at 3.58 MHz. and contain the desired color information but no phase drift, since the drift is cancelled by subtraction. This process effectively impresses the modulation on a new stable subcarrier of proper frequency for presentation on an NTSC television receiver.

Figure 4:
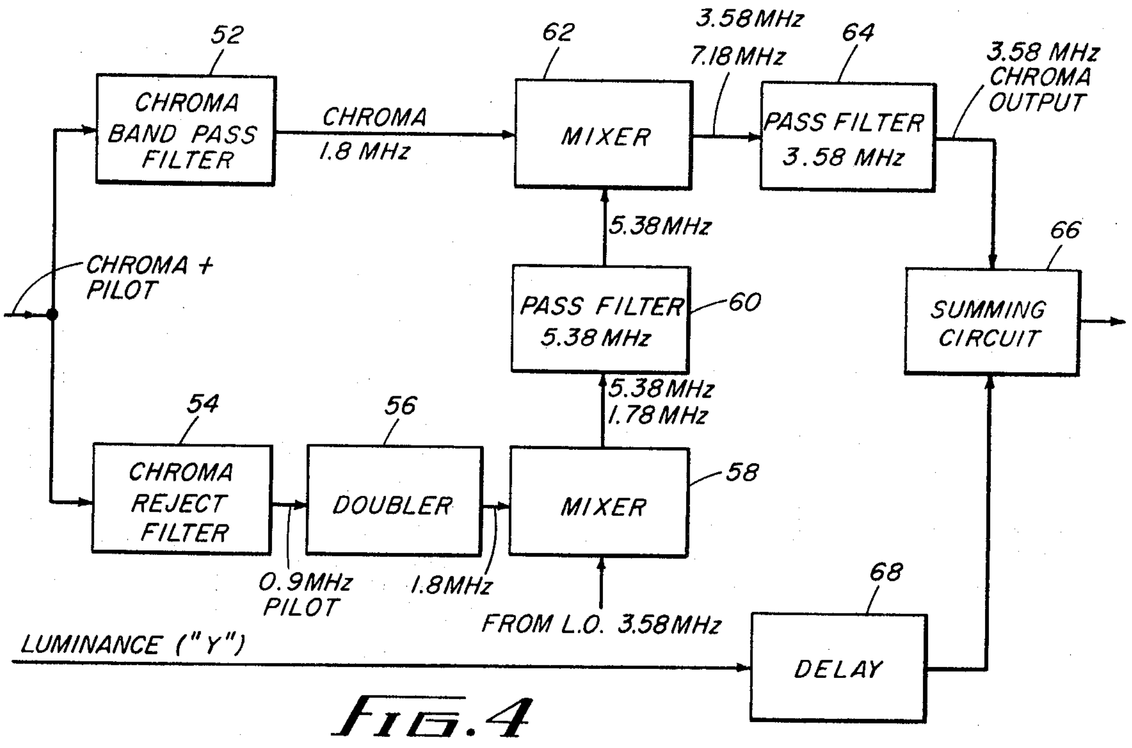
FIG. 4 is a block diagram of a preferred frequency translating system for translating the color information signals reproduced by the system of FIG. 3 to an NTSC color signal.

The technique can be implemented in a number of ways, a preferred system for processing a recorder color carrier frequency of 1.8 MHz. being shown in block diagram form in FIG. 4. The video signal from amplifier 48 (FIG. 3) is first separated into individual chroma and pilot signal paths by a pair of filters 52 and 54. Filter 52 may have a band pass of 1 to 2.5 MHz. so as to pass the broadband (1 MHz.) chroma signal centered at 1.8 MHz., and filter 54 is designed to reject frequencies above about 1 MHz and to pass the 0.9 MHz. pilot signal.

The nominally 0.9 MHz. pilot signal is doubled in a frequency doubler 56 and applied to a mixer 58 together with a stable locally generated 3.58 MHz. sinusoidal signal thereby to produce sum and difference frequencies of 5.38 MHz. and 1.78 MHz., respectively. The sum frequency signal from mixer 58 is selected by a band pass filter 60 and applied to a second mixer 62 to which is also applied the chroma signal centered about 1.8 MHz. The difference frequencies in the heterodyne product from this mixer, namely, the frequencies centered at 3.58 MHz., are selected by bandpass filter 64 and becomes the NTSC chroma signal. It may be shown by simple analysis that regardless of the spectral shift in the reproduced chroma frequency, the output of the translator will be a constant 3.58 MHz. chroma signal. Furthermore, if the 3.58 MHz. carrier is frequency interleaved by being an odd multiple of one-half the line rate, then the resultant NTSC chroma is likewise frequency interleaved.

As is well known, spurious spectral components are generated in any mixing process, and if present in the 3.58 MHz. output pass band of filter 64 of the translator would cause beats on the television picture. A color television receiver demodulates such spurious components along with the desired chroma to generate low frequency patterns. However, such beats are not visible when the chroma to spurious ratio is better than 40 db. It has been found that when a balanced diode bridge mixer, or a balanced four quadrant multiplier, is employed as the mixer 62, no spurious spectral components that could cause the undesirable low frequency patterns on the television screen are generated by the process of mixing the broadband chroma signal centered at 1.8 MHz. with the 5.38 MHz. signal.

The chroma output from filter 64 and the luminance signal from amplifier 50 (FIG. 3) are combined in a summing circuit 66, the output of which is used to modulate the output of a carrier oscillator (not shown) having the frequency of an unused channel of the television receiver on which the picture information is to be presented. Because of the delays introduced in the chroma signal by the translator, it is necessary to introduce a slight delay in the luminance signal in order to line up the chroma and luminance components. This may be done electronically by a suitable delay circuit 68, but is most easily accomplished by adjusting the physical spacing between the lenses 28 and 30 in the optical portion of the playback apparatus.

Figure 5:
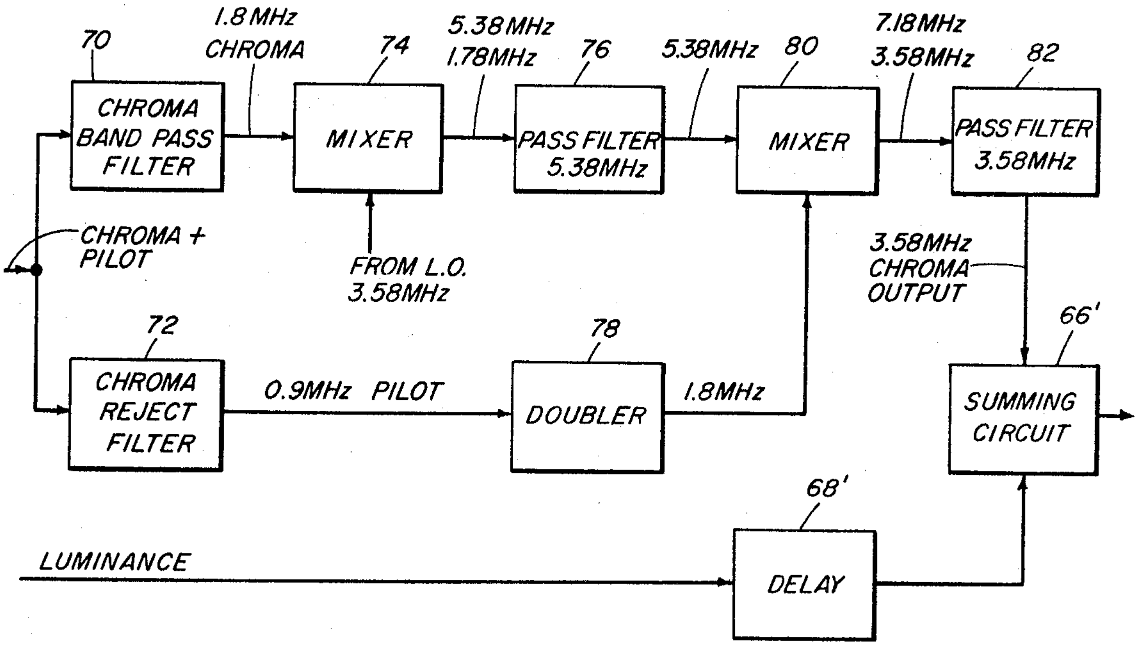
FIG. 5 is a block diagram of another embodiment of the frequency translating system.

FIG. 5 is a block diagram of another form of translator, which may be characterized as a dual chroma mixer translator. As in the circuit of FIG. 4, the chroma and pilot signals are separated by frequency filtering in filters 70 and 72, but in this case the broadband chroma signal centered at 1.8 MHz. is first mixed with a locally generated 3.58 MHz. subcarrier in mixer 74. The resultant sum frequency, centered at 5.38 MHz., is selected by pass filter 76 and applied to a second mixer 80. Also applied to mixer 80 is a 1.8 MHz. subcarrier derived from doubling (in doubler 78) the 0.9 pilot signal. The difference component of this mixing process is the desired NTSC chroma centered at 3.58 MHz. This signal is selected by pass filter 82 and applied along with the delayed luminance signal to summing circuit 66'.

It will be evident from the foregoing description that the translators of FIGS. 4 and 5 directly translate the 1.8 MHz. quadrature modulated color subcarrier recorded on the film to the NTSC 3.58 MHz. frequency so as to be compatible with NTSC receivers without any demodulation of the chroma information. Thus, the described technique of frequency translation completely eliminates the problems inherent in the decoding and re-encoding steps required in previous systems, and obviates the requirement for critical, expensive circuitry. More importantly, however, the use of the translator technique overcomes the problem of color drift and makes the system commercially acceptable. Although two translator configurations have been shown and described, it will now be evident to those skilled in the art that other translators can be devised to perform the overall function of directly translating to NTSC standards (or any other standard for that matter) the subcarrier frequency recorded on the film, which, in order to permit playback by the scanning technique is a multiple of the line frequency as above described. In this connection, it will be recognized that a recorded color subcarrier frequency other than 1.8 MHz. may be used, along with a pilot signal preferably one-half the subcarrier frequency, but also other sub-multiples of the subcarrier frequency, with the characteristics of the various elements of the translator modified to produce the required chroma output frequency.

Figure 6:
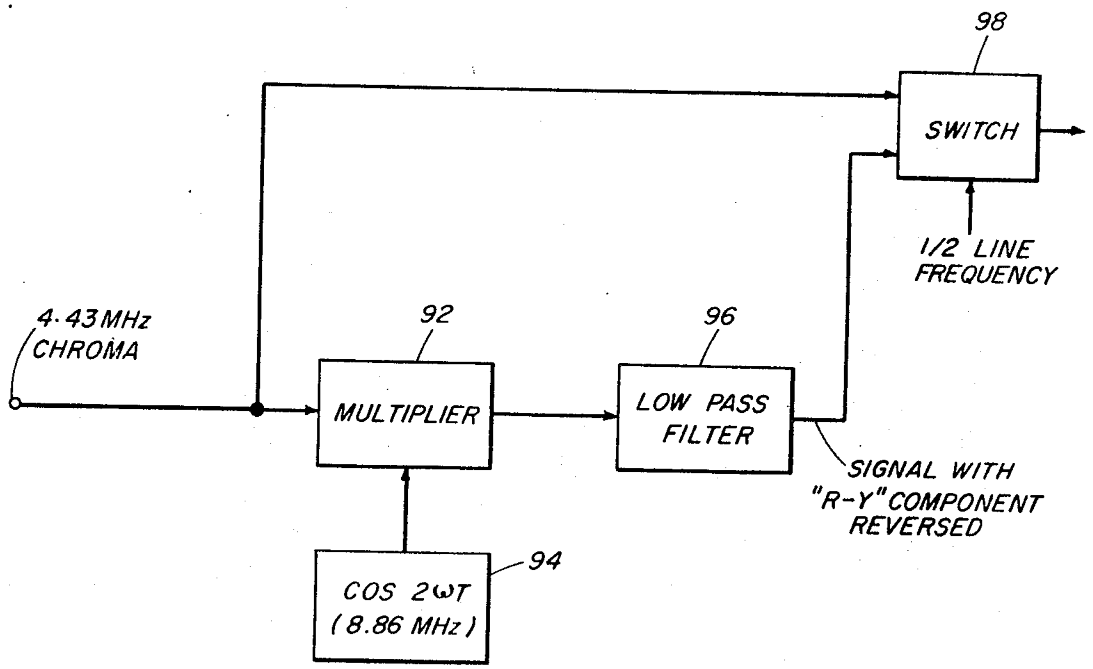
FIG. 6 is a block diagram of a system for processing signals produced by the circuits of either of FIGS. 4 and 5 for application to a color television receiver of the PAL type.

Moreover, with appropriate modification, the invention is directly applicable for the reproduction of recorded color picture information for presentation on a monitor in the PAL system, in which the chroma signal has a frequency of 4.43 MHz. As applied to the PAL system, the parameters of the translator, which may be of the form of either FIG. 4 or FIG. 5, are so selected relative to the frequency used in recording the color information on the record medium as to deliver a 4.43 MHz. chroma signal. As shown in the block diagram of FIG. 6, this chroma signal is split into two paths, one going directly to an electronic switch 98, and the other path including a multiplier 92 wherein the chroma signal is multiplied by cos $2\omega T$, namely, a signal having a frequency of 8.86 MHz. The lower sideband of the multiplication product is selected by a low pass filter 96, the output of which is then the chroma signal with the "R – Y" component reversed, as shown by Mayer in the *Royal Television Society Journal*, page 7, Vol. 12, 1968. The chroma signal with the "r – Y" component reversed is applied to the other terminal of switch 98, and the switch is operated at one-half the line frequency of the system thereby to deliver at its output a new chroma signal in which the phase of the "R – Y" component is reversed every other line, thus corresponding to PAL practice. The signal delivered by switch 98 is then added to the luminance (Y) signal to form a signal approaching a standard PAL signal suitable for application to a PAL monitor.

What is claimed is:

1. In apparatus for reproducing color picture information recorded on a record medium in a succession of information-bearing areas including areas carrying luminance picture information and different areas carrying color picture information in the form of superimposed records of a quadrature-modulated color carrier signal having a frequency which is a multiple of the line recording rate and a pilot signal having a frequency which is a sub-multiple of the color carrier frequency, the combination of:

means for conveying said record medium past a scanning gate, flying spot scanner means operative to simultaneously scan the luminance and chrominance information-bearing areas of a given color picture as said medium is conveyed past said scanning gate, and to separately detect the modulation of the scanning beam produced by the information contained in said luminance and chrominance carrying areas to derive a first video signal containing said modulated color carrier signal and said pilot signal, and a second video signal containing said luminance picture information, and frequency translating means to which said first video signal is applied, said frequency translating means including filter means for separating said first video signal into its modulated color carrier, and pilot signal components, means for doubling the frequency of said pilot signal component, a local source of signal having a frequency which is a multiple of one-half of the aforesaid line recording rate, and means including at least one mixer circuit operative in response to the frequency-doubled pilot component and the signal from said local source to directly convert the modulated carrier portion of said first video signal to a second modulated color carrier signal having the frequency of the signal from said local source.

2. Apparatus according to claim 1 further including summing means for combining said second modulated color carrier signal and said second video signal, and means for delaying said luminance-containing signal relative to said second modulated color carrier signal by an amount to line up the luminance and chrominance components of a given picture.

3. Apparatus according to claim 1 further including means for multiplying said second modulated color carrier signal with a signal having twice the frequency of said second modulated color carrier signal, filter means connected to the output of said multiplying means for selecting the lower sideband multiplication product, a switch operable at one-half said line recording rate and having first and second input terminals to which said second modulated color carrier signal and the output signal from said filter means are respectively applied, said switch thereby being operative to deliver a third modulated color carrier signal in which the phase of a color component thereof is reversed every other line, and summing means for combining said third modulated color carrier signal and said second video signal.

4. In apparatus for reproducing color picture information recorded on a record medium in a succession of information-bearing areas including areas carrying luminance picture information and different areas carrying color picture information in the form of superimposed records of a color carrier signal having a frequency which is a multiple of the line recording rate and quadrature-modulated with color information components, and a pilot signal having a frequency which is a sub-multiple of the color carrier frequency and forming a closely-spaced series of parallel lines extending longitudinally of said different areas, the combination of:

means for transporting the record medium through a scanning zone, flying spot scanner means operative to simultaneously scan the luminance and chrominance information-bearing areas of a given color picture in a direction generally normal to the line series as the medium is transported past said scanning zone and to separately detect the modulation of the scanning beam produced by the information contained in said luminance and chrominance carrying areas to derive a first video signal containing said modulated color carrier signal and said pilot signal, and a second video signal containing said luminance picture information, and frequency translating means to which said first video signal is applied, said translating means including filter means operative to separate said first video signal into its modulated color carrier and pilot signal components, means for doubling the frequency of said pilot signal component, a local source of signal having a frequency which is a multiple of one-half of the aforesaid line recording rate, and means including at least one mixer circuit operative in response to the frequency-doubled pilot component of said first video signal and the signal from said local source directly to convert the modulated carrier portion of said first video signal to a second modulated color carrier signal having a frequency equal to the signal from said local source.

5. Apparatus according to claim 4 wherein the frequency of the color carrier recorded on the record medium is 1.8 MHz., the frequency of said pilot signal is 0.9 MHz., and the frequency of the signal from said local source is 3.58 MHz..

6. Apparatus according to claim 5 wherein said frequency translating means further includes means for mixing the doubled pilot frequency signal with a 3.58 MHz. signal from said local source to produce sum and difference frequencies, filter means operative to select said sum frequency signal, means for mixing said selected sum frequency signal with said modulated color carrier signal to produce sum and difference frequencies, and filter means for selecting said difference frequency signals thereby to produce a color carrier signal having a frequency of 3.58 MHz. modulated in accordance with the modulation carrier on the record medium.

7. Apparatus according to claim 6, further including summing means for combining said 3.58 MHz. modulated color carrier signal and said second video signal, and means for delaying said second video signal relative to said second modulated color carrier signal by an amount to line up the luminance and chrominance components of a given picture.

8. Apparatus according to claim 5 wherein said frequency translating means further includes means for mixing said modulated color carrier component with a signal from said local source to produce sum and difference frequencies, filter means operative to select the sum frequencies from said first mixing means, second mixing means to which said frequency-doubled pilot signal and said sum frequency signal are applied, said second mixing means being operative to produce sum and difference frequencies, and filter means operative to pass signals having a passband corresponding generally to the band-width of said modulated color carrier signal and centered at said difference frequency thereby to produce a second color carrier signal having a center frequency corresponding to the frequency of said local source and modulated in accordance with the modulation recorded on said record medium.

* * * * *